(12) United States Patent
Liu

(10) Patent No.: US 7,477,664 B2
(45) Date of Patent: Jan. 13, 2009

(54) NONLINEAR POLARIZATION PULSE SHAPING MODE LOCKED FIBER LASER

(75) Inventor: Jian Liu, Sunnyvale, CA (US)

(73) Assignee: PolarOnyx, Inc., Sunnyvale, CA (US)

(*) Notice: Subject to any disclaimer, the term of this patent is extended or adjusted under 35 U.S.C. 154(b) by 146 days.

(21) Appl. No.: 11/093,519

(22) Filed: Mar. 29, 2005

(65) Prior Publication Data
US 2005/0238066 A1 Oct. 27, 2005

Related U.S. Application Data

(60) Provisional application No. 60/560,984, filed on Apr. 12, 2004.

(51) Int. Cl.
*H01S 3/30* (2006.01)
*H01S 3/10* (2006.01)
(52) U.S. Cl. .................. 372/6; 372/22; 372/27
(58) Field of Classification Search .......... 372/6, 372/22, 27
See application file for complete search history.

(56) References Cited

U.S. PATENT DOCUMENTS

| 5,134,620 | A  | * | 7/1992  | Huber ..................... 372/6   |
| 6,130,766 | A  | * | 10/2000 | Cao ..................... 398/147   |
| H1926     | H  | * | 12/2000 | Carruthers et al. ........ 372/6    |
| 6,778,565 | B2 | * | 8/2004  | Spuehler et al. .......... 372/25   |
| 6,782,146 | B2 | * | 8/2004  | Hellman et al. ........... 385/11   |
| 6,814,376 | B2 | * | 11/2004 | Yu et al. ................ 385/122  |
| 2003/0156605 | A1 | * | 8/2003 | Richardson et al. ........ 372/25 |

* cited by examiner

*Primary Examiner*—Minsun Harvey
*Assistant Examiner*—Patrick Stafford
(74) *Attorney, Agent, or Firm*—Xin Wen

(57) ABSTRACT

A fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape.

31 Claims, 6 Drawing Sheets

Schematic diagram of an all-fiber based mode locked fiber laser

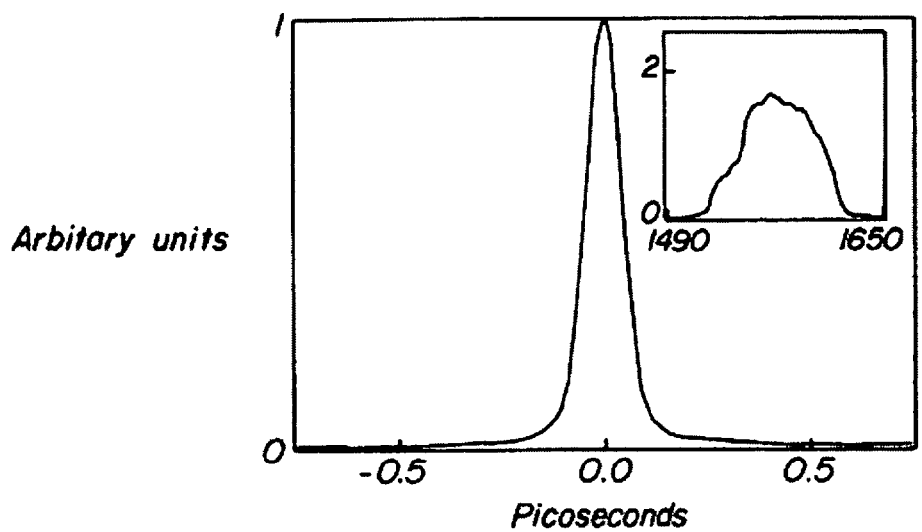
Figure 1 Prior Art
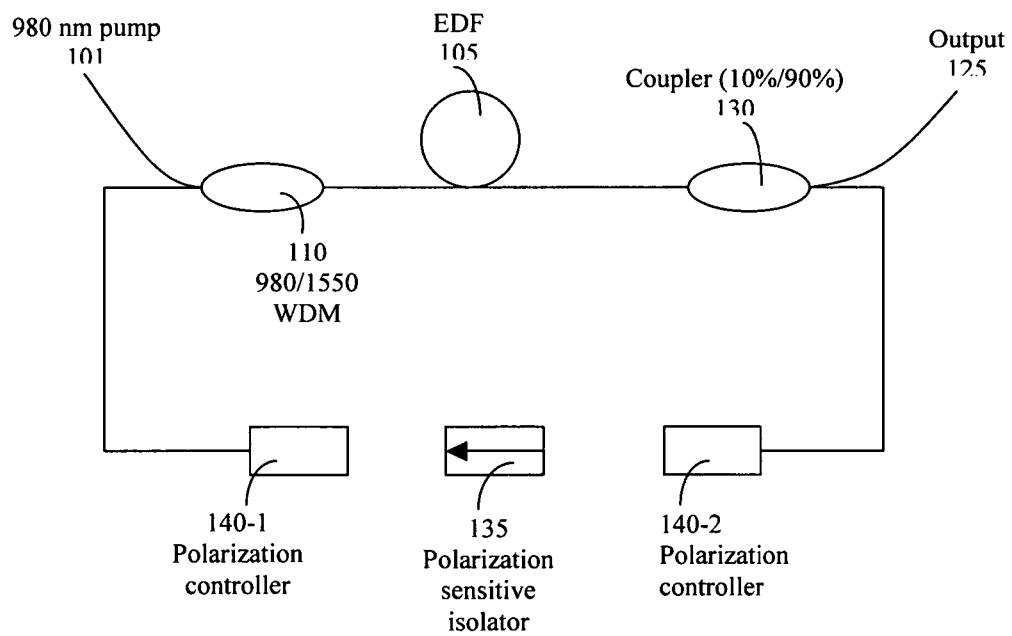
Figure 2 A nonlinear polarization pulse shaping mode locked fiber laser

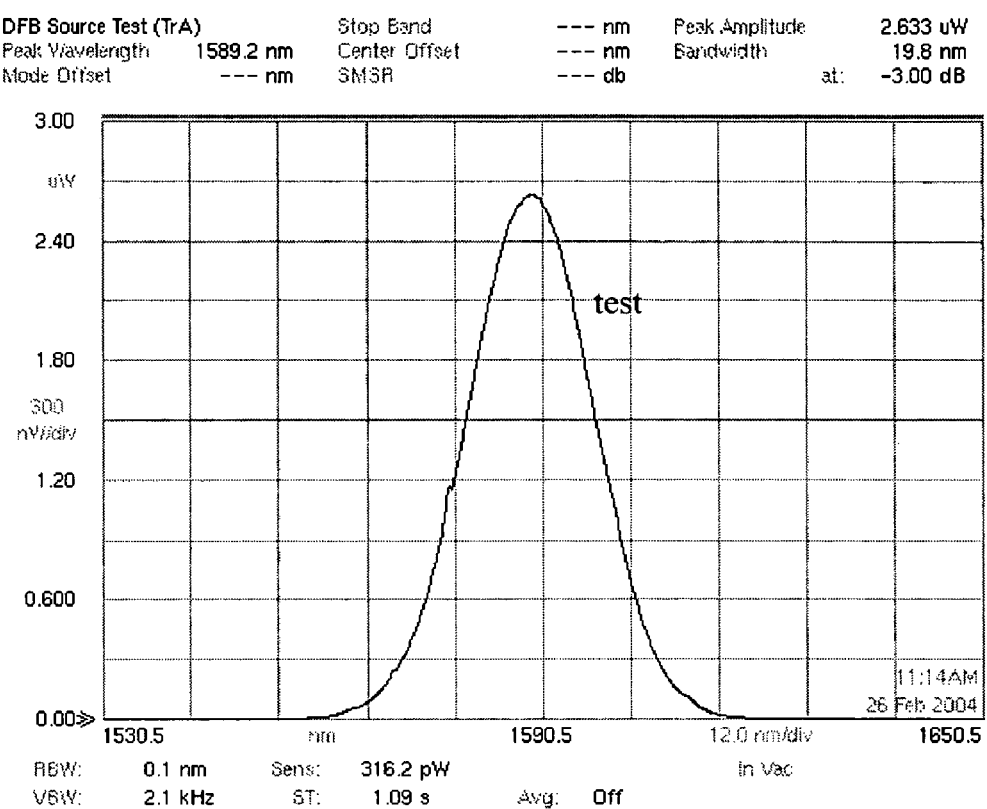
Figure 3A Output spectrum from a mode locked fiber laser
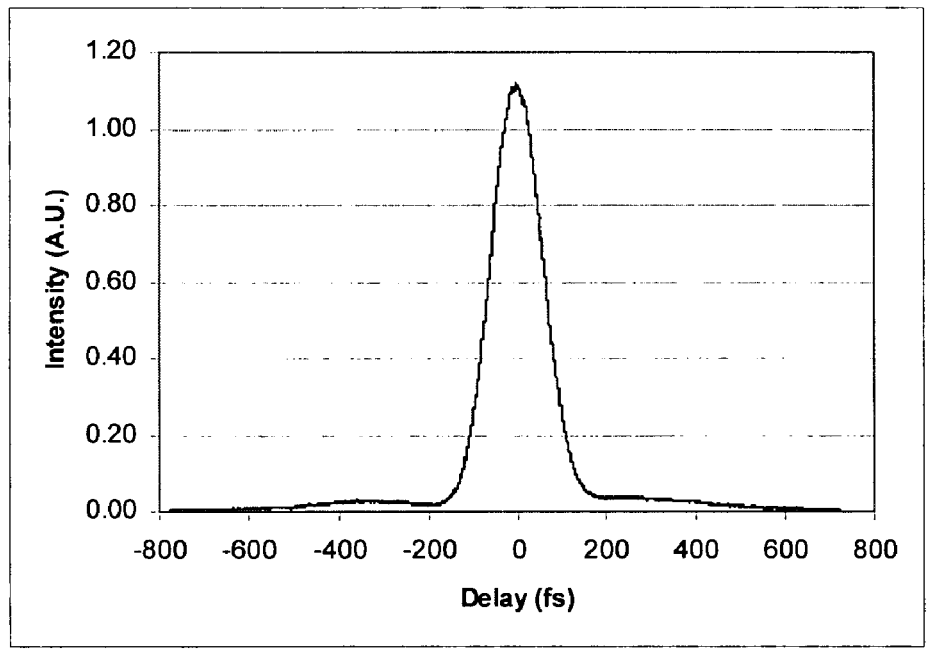
Figure 3B Autocorrelator trace for pulse width measurement (150 fs)

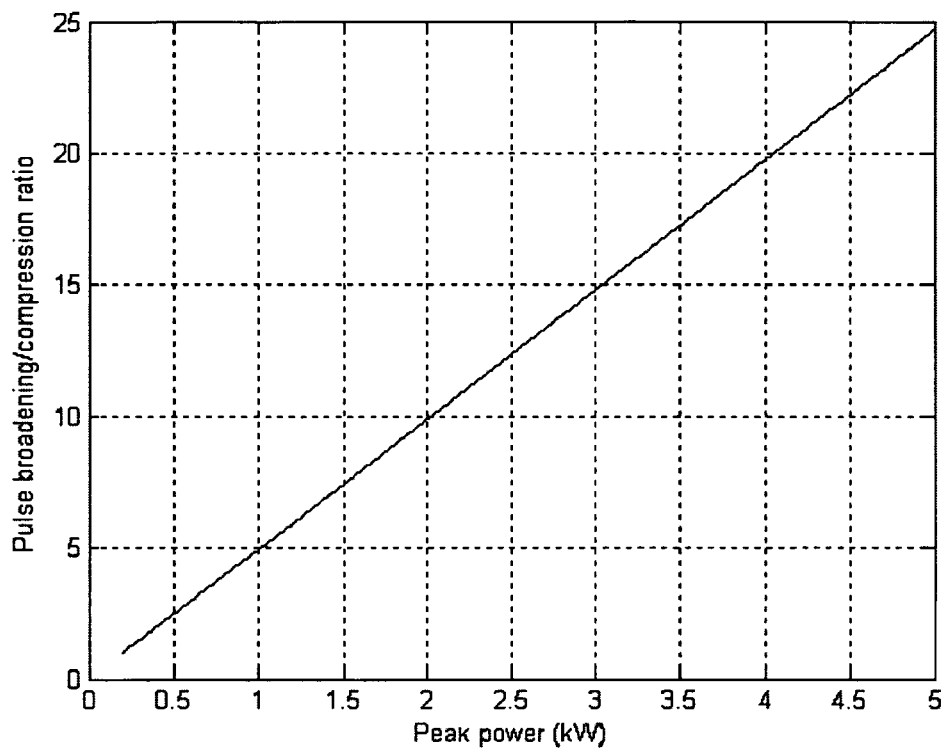
Figure 3C simulation pulse broadening/compression results for a 1 m fiber with dispersion of 17 ps/nm/km and a pulse width of 200 fs.

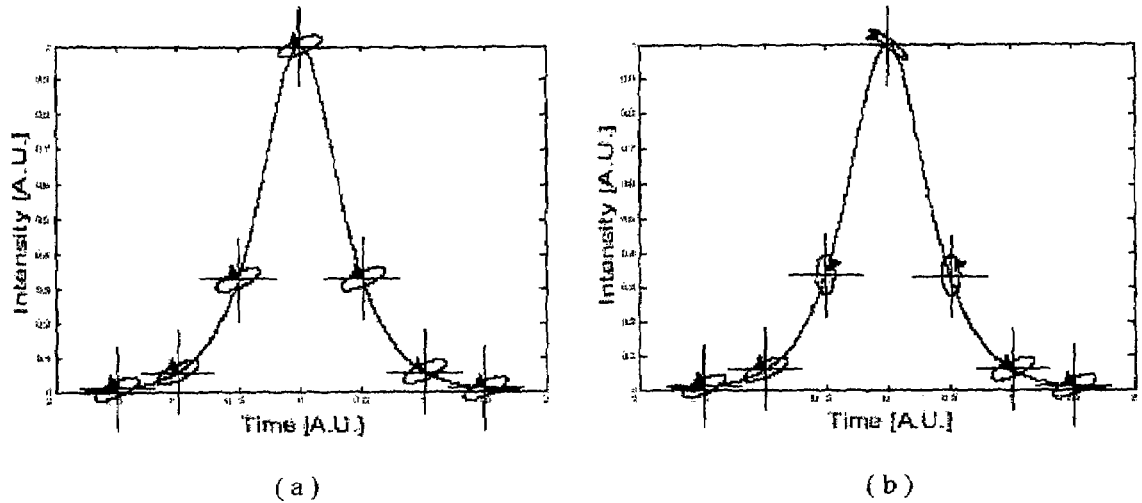
Figures 4A and 4B Polarization states of a pulse
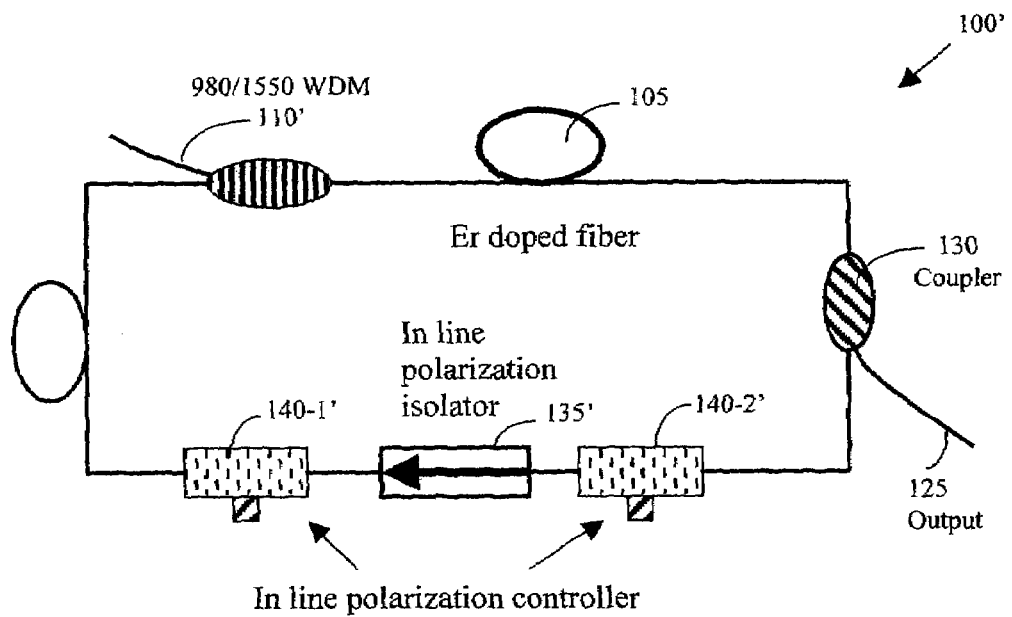
Figure 5 Schematic diagram of an all-fiber based mode locked fiber laser

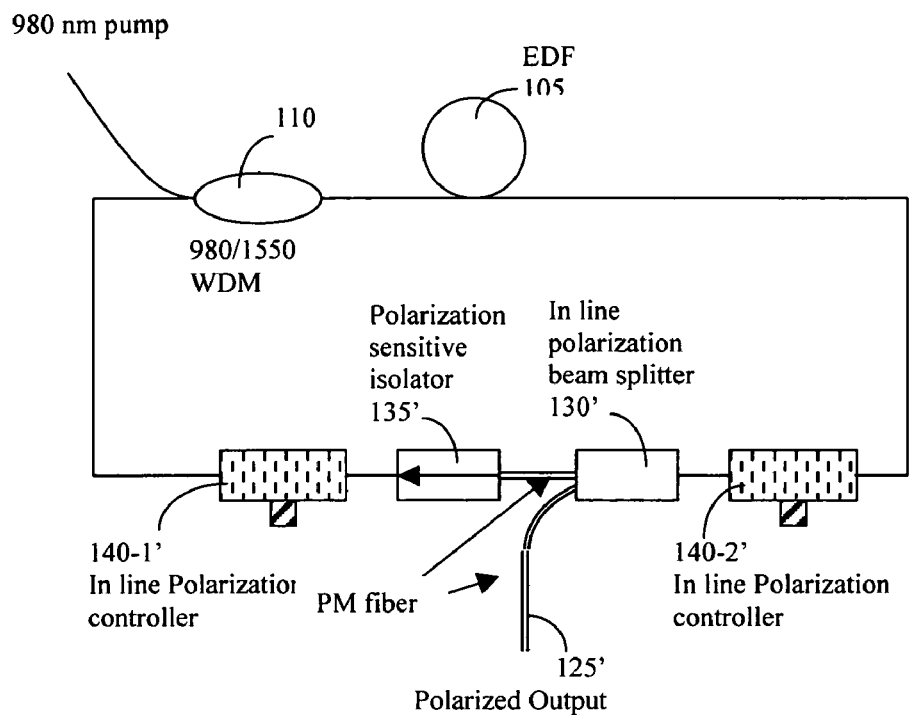
Figure 6 a nonlinear polarization pulse shaping mode locked fiber laser in achieving polarization output

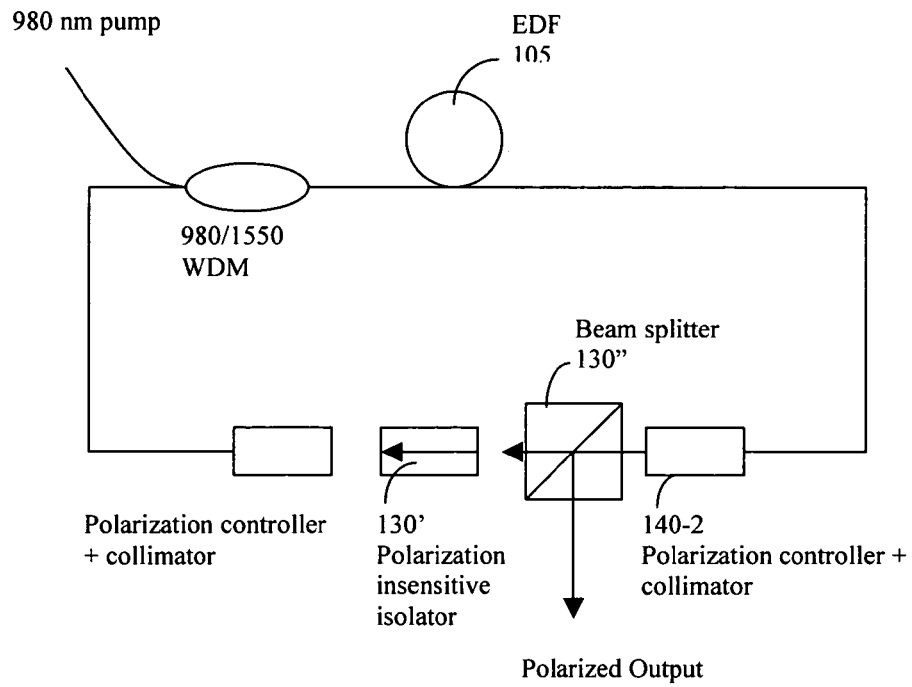
Figure 7A  A nonlinear polarization pulse shaping mode locked fiber laser in achieving polarization output
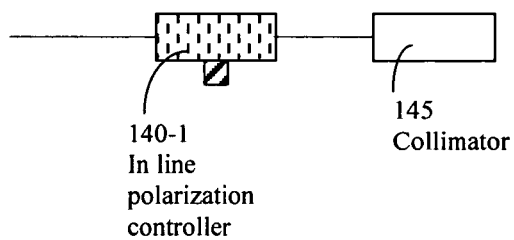
Figure 7B  One type of polarization controller with collimator
NONLINEAR POLARIZATION PULSE SHAPING MODE LOCKED FIBER LASER This Formal Application claims a Priority Date of Apr. 12, 2004 benefit from a Provisional Patent Application 60/560, 984 filed by the same Applicant of this Application.

FIELD OF THE INVENTION

The present invention relates generally to apparatuses and methods for providing short-pulsed mode-locked fiber laser. More particularly, this invention relates to new configurations and methods for providing a nonlinear polarization pulse-shaping mode-locked fiber laser with improved and better controllable pulse shapes.

BACKGROUND OF THE INVENTION

Conventional technologies of generating short pulse mode-locked fiber laser are still confronted with technical difficulties and limitations that the pulse shapes of the short-pulse laser cannot be properly and conveniently controlled. The difficulty is even more pronounced when the pulse width is further reduced. There is an urgent demand to resolve these technical difficulties as the broader applications and usefulness of the short pulse mode-locked are demonstrated for measurement of ultra-fast phenomena, micro machining, and biomedical applications.

An active pulse shaping mode locked fiber laser was disclosed by J. D. Kafka, T. Baer, and D. W. Hall in a paper entitled "Mode locked erbium doped fiber laser with soliton pulse shaping," Opt. Lett. 22, 1269-1271 (1989). Different from the active pulse shaping mode locked fiber laser, intensity dependent polarization rotation or nonlinear polarization evaluation (NPE) has been identified as a fast response saturation absorber (SA) to achieve short pulse fiber laser as presented by C. J. Chen, P. K. Wai, in "Soliton fiber ring laser," Opt. Lett. 17, 417-419 (1992). However, D. U. Noske, N. Pandit, J. R. Taylor and K. Tamura, H. A. Haus, and E. I. Ippen have showed by their experimental results that longer pulse widths and come with unwanted sidebands that degraded the performance of the soliton fiber lasers. More details can be referred to D. U. Noske, N. Pandit, J. R. Taylor, "Subpico-second soliton pulse formation from self mode locked erbium fiber laser using intensity dependent polarization rotation," Electronics Letters 28, 2185 (1992) and K. Tamura, H. A. Haus, and E. I. Ippen, "Self starting additive pulse mode locked erbium fiber ring laser," Electonics Letters 28, 2226 (1992). To further reduce the pulse width, stretched pulse fiber laser were proposed using short length of fiber cavity and operating at positive dispersion region. A 77 fs pulse fiber laser has been demonstrated. These demonstrations were discussed in K. Tamura, et al., "77 fs pulse generation from a stretched pulse mode locked all fiber ring laser," Opt. Lett. 18, 1080 (1993) and Tamura, et al., Stretched pulse fiber laser, U.S. Pat. No. 5,513,194, 1996. However, they have not achieved transform-limitedly shaped pulse, because the spectrum is not symmetrically Gaussian/Soliton shape and time bandwidth product (TBP) is too large. It is still remained a challenge to obtain transform limited pulse.

More specifically, in U.S. Pat. No. 5,513,194 Tamura et al. disclosed a fiber laser for producing high-energy ultra-short laser pulses, having a positive dispersion fiber segment and a negative-dispersion fiber segment joined in series with the positive-dispersion fiber segment to form a laser cavity. With this configuration, soliton effects of laser pulse circulation in the cavity are suppressed and widths of laser pulses circulating in the cavity undergo large variations between a maximum laser pulse width and a minimum laser pulse width during one round trip through the cavity. The fiber laser also provides means for mode-locking laser radiation in the laser cavity, means for providing laser radiation gain in the laser cavity, and means for extracting laser pulses from the laser cavity. Using selected positive- and negative-dispersion fiber segments, the laser cavity exhibits a net positive group velocity dispersion, and the ratio of the maximum laser pulse width to the minimum laser pulse width attained during one round trip through the cavity is greater than 5, and preferably greater than 10. The laser cavity may be configured with different cavity geometries and preferably the ring cavity to achieve unidirectional circulation of laser pulses to produce laser pulses having a pulse width of less than 100 fs and a pulse energy of at least 80 pJ. However, as that shown in FIG. 1, the waveform of the short pulse laser still present distorted pulses and the laser so generated is not a transform-limited shape and still have limited applications in telecommunications since such laser pulse is not able to overcome the problems of the non-linearity and dispersion effects of the laser pulses during the transmission. The distorted pulse shapes are caused by the unbalanced dispersion and the non-linearity of control for operating the laser at the positive net dispersion region. For these reasons, the laser disclosed by Tamura et al. cannot achieve a higher laser transmission efficiency of the transformed-limited shape.

Therefore, a need still exists in the art of fiber laser design and manufacture to provide a new and improved configuration and method to provide short pulse mode-locked fiber laser with better controllable pulse shapes such that the above discussed difficulty may be resolved.

SUMMARY OF THE PRESENT INVENTION

It is therefore an object of the present invention to provide a method of using nonlinear polarization evolution (NPE) and dispersion managed fiber cavity to manipulate the pulse propagation in the cavity and balance the self phase modulation (SPM) and dispersion induced pulse broadening/compressing. This method of polarization pulse effects of fiber length, the non-linear effects and dispersion such that the above-described difficulties encountered in the prior art can be resolved.

Specifically, it is an object of this invention to provide a new short-pulse mode-locked fiber laser with a ring structure that includes a 980/1550 WDM (wavelength division multiplexing) coupler for introducing a laser projection to a gain medium to amplify the pulse for transmitting in a cavity that includes fiber segments of positive and negative dispersions. The laser transmission then passes through a polarization sensitive isolator controlled by polarization controller to carry out a pulse shaping for generating extra-short pulse of laser conforming to the transform-limited pulse shapes.

Briefly, in a preferred embodiment, the present invention discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. The fiber laser cavity further includes a polarization sensitive isolator and a polarization controller for further shaping the output laser. In a preferred embodiment, the gain medium includes an erbium doped fiber constitutes a positive dispersion fiber segment. In a preferred embodiment, the laser cavity is a ring cavity. The laser cavity further includes an output coupler for transmitting a portion of a laser as the output laser from the fiber laser cavity. In another preferred embodiment, the laser cavity further includes a single mode fiber constituting a fiber segment of a negative dispersion connected to the gain medium.

In a preferred embodiment, this invention further discloses a method for method for generating a pulse-shaped transform-limited output laser from a laser cavity that includes a laser gain medium. The method includes a step of forming the laser cavity by employing a positive dispersion fiber segment and a negative dispersion fiber segment for generating a net negative dispersion. The method further includes a step of projecting an input laser from a laser pump into said fiber laser cavity for balancing a dispersion induced nonlinearity with a self-phase modulation (SPM) in said fiber laser cavity for generating an output laser with a transform-limited pulse shape.

In another preferred embodiment, this invention further discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. The fiber laser cavity further includes a polarized insensitive isolator for receiving a collimated beam from a collimator coupled to a polarization controller for projecting an isolated beam to a beam splitter for generating a polarized transform-limited output laser.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 shows the pulse shape generated by a prior art invention.

FIG. 2 is functional block diagram for a short-pulse mode-locked fiber laser of this invention.

FIG. 3A is a waveform for showing the output spectrum from a mode-locked fiber laser as shown in FIG. 1.

FIG. 3B is a waveform for showing an autocorrelator trace for pulse width measurement (150 fs).

FIG. 3C shows the pulse broadening/compression ratio as function of the peak power for a 1 m fiber with dispersion of 17 ps/nm/km and a pulse width of 200 fs.

FIGS. 4A and 4B are waveforms for showing polarization changes as laser pulse transmitted over a laser cavity.

FIG. 5 is a functional block diagram of another preferred embodiment of an all fiber-based short-pulse mode-locked laser of this invention.

FIG. 6 is a functional block diagram of another preferred embodiment of a nonlinear polarization pulse shaping short-pulse mode-locked laser of this invention.

FIG. 7A is a functional block diagram of another preferred embodiment of an alternate nonlinear polarization pulse shaping short-pulse mode-locked laser of this invention.

FIG. 7B is a diagram for showing a type of polarization controller with a collimator.

DETAILED DESCRIPTION OF THE INVENTION

Referring to FIG. 2 for a schematic diagram of a nonlinear polarization pulse-shaping mode locked fiber laser 100 of this invention. The fiber laser is a ring structure laser that includes a gain medium (EDF) 105, a polarization sensitive isolator 135, polarization controllers 140-1 and 140-2, a 980/1550 WDM coupler 110, and an output coupler 130. One meter of Erbium doped fiber (EDF) 105 was used in the fiber laser as a gain medium and is used to amplify and compress the pulse width. The fiber has a high doping concentration (80 dB/m at 1530 nm) with a dispersion of −55 ps/nm/km. A 980 nm high power pump laser diode 101 coupled through a wavelength division multiplexer 110 is used to pump the EDF 105 to amplify the pulses circulating in the cavity. The rest of the cavity comprising a single mode (SM) fiber (17 ps/nm/km) 115 having a length about three meters and an HI 1060 fiber 120 commercially provided by Corning as standard fiber with dispersion 14 ps/nm/km at 1550 nm having a length of about 0.5 meter. The output fiber pigtail 125 includes a single mode (SM) fiber having a length of about one meter. A coupler 130, e.g., a 10%/90% coupler, is coupled between the single mode (SM) fiber 115 and the output fiber to transmit a portion of the light, e.g., 90% of the light, out of the cavity. The coupling ratio can also be adjusted to obtain different power levels of output. The gain medium EDF 105 has a normal dispersion fiber ($\beta''>0$) and remainder portions of the fibers are negative dispersion fibers ($\beta''<0$), the whole cavity average dispersion is designed to operate at anomalous dispersion ($\beta''<0$) to achieve a stable transform-limited pulse.

The fiber laser 100 of this invention is different from the conventional laser as that disclosed by C. J. Chen, P. K. Wai, in "Soliton fiber ring laser," Opt. Lett. 17, 417-419 (1992) and D. U. Noske, N. Pandit, J. R. Taylor, in "Subpicosecond soliton pulse formation from self mode locked erbium fiber laser using intensity dependent polarization rotation," Electronics Letters 28, 2185 (1992). The fiber laser 100 of this invention generates the transform-limited short pulse mode locked fiber laser by a combination of negative and positive dispersion fibers to manage the pulse propagation in the cavity and balance the self phase modulation (SPM) and dispersion to reduce the saturation effects in the amplification region. The erbium-doped fiber (EDF) 105 is a positive dispersion fiber and the remaining portions of the fibers are negative dispersion fibers. The ratio of the positive to the negative dispersions in one of the preferred embodiment is approximately 2 to 5. When the nonlinear length and dispersion length are comparable, e.g., within a ratio of 1-3, the shape of soliton, or other transform-limited pulse, maintains the pulse shape while in propagation through either transmission fiber or gain medium. The nonlinear length, i.e., $Lnl=1/\gamma P$, where P is the peak power of the pulse and $\gamma$ is nonlinear coefficient, and the dispersion length, i.e., $Ld=T^2/|\beta''|$, where T is the pulse width, provides the length scale over which the dispersive effects or nonlinear effects become important for pulse evolution along a fiber segment. When the fiber length is longer or comparable to both the dispersion length Ld and the nonlinear length Lnl, the dispersion and the nonliearity work together for pulse propagation along the fiber.

Actual implementation of the laser configuration substantially similar to a system shown in FIG. 2 has been performed in the laboratory. Adjustments for tuning the two polarization controllers 140-1 and 140-2 are carried out by adjusting the current to 250 mW to generate pulsed output. The mode locked pulses are self-started when the laser is turned on and can be maintained down to 100 mW. FIG. 3A shows its spectrum in linear scale with a bandwidth of 20 nm. It is very close to a soliton shape. FIG. 3B represents its pulse width measurement by using an autocorrelator (150 fs). The TBP is calculated to be 0.37, indicating a good soliton pulse. The repetition rate is about 50 MHz. Average power can be varied from 1 mW to 5 mW. FIG. 3C shows a computational results of the pulse broadening-/compression ratio as function of the peak power for a 1 m fiber with dispersion of 17 ps/nm/km and a pulse width of 200 fs.

A fiber exhibits a nonlinear birefringence that depends on the local intensities of the two orthogonally polarized field components. As a result, an elliptically polarized pulse will have two orthogonal components, i.e., x and y components. These two components experience different phase shifts, thus rotating the polarization ellipse. Since the phase shift is an intensity-dependent process, it rotates the polarization of a pulse at different amounts depending on the pulse's local intensity. FIGS. 4A and 4B show polarization's physical effect on a pulse. If the nonlinear effects are ignored and let FIG. 4A represent a uniformly polarized pulse launches into an isotropic optical fiber, a uniformly polarized output pulse is obtained as that depicted by FIG. 4B. Therefore, by launching the same pulse into the same fiber implemented with the effects of self phase modulation (SPM) and Cross phase modulation (XPM), an output similar to FIG. 4B can be generated. Examining FIG. 4B, it is noted that the low intensity wings are not affected, yet, as the pulse's intensity increases, a rotation of the polarization ellipse is observed. Therefore, a nonlinear phase evolution (NPE) induced by the nonlinear phase change of self-phase modulation (SPM) causes a polarization rotation, as the polarization is now pulse intensity dependent. Thus, the mode lock mechanism is caused by the SPM induced NPE. When the pulse passes through the polarization sensitive isolator that is controlled and adjusted by a polarization controller, only the highest intensity that lined up with the isolator will pass. The lower intensity part of the pulse is filtered out. Therefore, the pulse is well shaped and thus works as a saturation absorber (SA) to reduce the pulse width. The polarization controller 140 can be fiber based, or bulk optical quarter/half wave retarders, or a combination of both. The "polarization sensitive isolator and polarization controllers" works to select a polarization for the pulses, which have different polarization states in time domain.

When the pulse circulates in the fiber laser cavity, the laser pulse experiences the self-phase modulation (SPM) induced pulse broadening effects in both negative anomalous single mode fibers and positive normal dispersion fiber regions due to a high peak power and short pulse width (<ps). Moreover, in the region of positive dispersion, i.e., $\beta''>0$, in the EDF 105, because the peak power is very high (>200 W for a 200 fs pulse), the nonlinear length and the dispersion length are comparable, i.e., ~1 m, in the EDF 105 segment. The pulse can be compressed by using the effects of both self phase modulation (SPM) and dispersion.

Referring to FIG. 5 for a mode-locked fiber laser 100' formed with all fiber-based components. The fiber laser has a ring configuration receiving a laser input through a 980 or 1550 nm WDM 110. The all fiber-based laser 100' similar structure as that shown in FIG. 2 with an erbium doped fiber 105 as a gain medium to amplify and compress the pulse width. The all fiber-based laser 100' employs an in-line polarization controller 140-1' and 140-2' before and after an in-line polarization sensitive isolator 135' that is implemented with single mode (SM) fiber pigtails. The in-line polarization sensitive control may be a product commercially provided by General Photonics, e.g., one of PolaRite family products.

Similar to the laser shown in FIG. 2, the gain medium EDF 105 has a normal dispersion fiber ($\beta''>0$) and rest of the fibers are negative dispersion fibers ($\beta''<0$), the whole cavity average dispersion is designed to operate at anomalous dispersion ($\beta''<0$) to achieve a stable transform-limited pulse. All fiber solution as shown provides advantages of compactness and robustness thus more suitable for practical industrial applications.

Referring to FIG. 6 for a preferred embodiment similar to that shown in FIG. 2 to achieve an all fiber solution for mode-locked fiber laser to generate an output polarized laser. Instead of an output coupler 130 as that implemented in FIGS. 2 and 5, an in-line beam splitter 130' is used that has a single mode input fiber with a polarization maintaining (PM) output fiber 125'. The in-line isolator 135 can be either a polarization sensitive or a polarization insensitive isolator. The output from the PM output fiber 125' provides seed pulses for further pulse amplification and second harmonic generation.

Referring to FIG. 7 for another preferred embodiment similar to that shown in FIG. 2 to generate a polarized output by placing a polarization splitter 130'' between the collimators of the polarization controllers 140-1 and 140-2. This embodiment is configured with some free space components. FIG. 7B shows the inline polarization controller 140-1 is connected to a collimator 145 for collimating the light for projecting to the polarization sensitive isolator 135 and the polarization beam splitter 130''. This embodiment provides the advantageous features of generating polarized output and application of a fiber-based polarization controller.

According to FIGS. 1-7 and above descriptions, this invention discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape. In a preferred embodiment, the fiber laser cavity further includes a polarization sensitive isolator and a polarization controller for further shaping the output laser. In a preferred embodiment, the gain medium includes an erbium-doped fiber constituting a positive dispersion fiber segment with a dispersion about −55 ps/nm/km. In another preferred embodiment, the laser cavity is a ring laser cavity. In a preferred embodiment, the fiber laser cavity further includes an output coupler for transmitting a portion of a laser as the output laser from the fiber laser cavity. In a preferred embodiment, the fiber laser cavity further includes a single mode fiber constituting a fiber segment of a negative dispersion connected to the gain medium. In a preferred embodiment, the output laser comprising a laser having a Gaussian pulse shape. In a preferred embodiment, the output laser comprising a laser having a soliton pulse shape. In a preferred embodiment, the output laser comprising a laser having a hyperbolic pulse shape. In a preferred embodiment, In a preferred embodiment, a ration of a positive dispersion to a negative dispersion is approximately two to five (2:5). In a preferred embodiment, a nonlinear length and a dispersion length having a ration ranging from one to three (1 to 3) for maintaining a transform-limited laser pulse in the laser cavity in propagating through the positive and negative dispersion fiber segments. In a preferred embodiment, the fiber laser cavity further includes an in-line polarization sensitive isolator implemented with a single mode (SM) fiber pigtails and an inline polarization controller for further shaping the output laser. In a preferred embodiment, the fiber laser cavity further includes an inline splitter having a single mode (SM) input fiber and a polarization maintaining (PM) output fiber for transmitting a polarized output laser. In a preferred embodiment, the fiber laser cavity further includes a polarization sensitive isolator and a polarization controller implemented with a collimator for further shaping the output laser. The laser cavity further includes an inline polarization splitter disposed next to the collimator of the polarization controllers for collimating and projecting a laser transmission to the polarization sensitive isolator and to transmit a polarized output laser.

In a preferred embodiment, this invention discloses a fiber laser cavity that includes a laser gain medium for receiving an optical input projection from a laser pump. The fiber laser cavity further includes a positive dispersion fiber segment and a negative dispersion fiber segment for generating a net negative dispersion for balancing a self-phase modulation (SPM) and a dispersion induced pulse broadening/compression in the fiber laser cavity for generating an output laser with a transform-limited pulse shape wherein the fiber laser cavity further comprising all fiber based components.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A mode-locked fiber laser, comprising:
   an input coupler configured to couple pump light into a laser cavity;
   a fiber-based gain medium configured to amplify signal laser pulses in response to the pump light, wherein the signal laser pulses each has a peak portion having a peak polarization and a wing portion having a wing polarization different from the peak polarization;
   a first fiber segment having a normal (positive) dispersion;
   a second fiber segment having an anomalous (negative) dispersion to compensate the normal dispersion of the first fiber segment;
   a first fiber-based polarization controller configured to align the peak polarizations of the signal laser pulses along a first polarization direction;
   a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;
   a second fiber-based polarization controller configured to control the peak polarization of the peak portions of the signal laser pulses received from the polarization isolator, wherein the first fiber-based polarization controller, the polarization isolator, and the second fiber-based polarization controller are configured to produce mode locking in the signal laser pulses, wherein the polarization isolator is positioned between the first fiber-based polarization controller and the second fiber-based polarization controller, and wherein the input coupler, the fiber-based gain medium, the first fiber-based polarization controller, the polarization isolator, and the second fiber-based polarization controller in part define the laser cavity; and
   an output coupler configured to direct portions of the signal laser pulses as output laser pulses out of the laser cavity.

2. The mode-locked fiber laser of claim 1, wherein the output coupler comprises a polarization beam splitter configured to direct a polarized portion of the signal laser pulses out of the laser cavity.

3. The mode-locked fiber laser of claim 2, wherein the polarization beam splitter is positioned between the first fiber-based polarization controller and the second fiber-based polarization controller in the laser cavity.

4. The mode-locked fiber laser of claim 2, wherein the polarization beam splitter is separated from the polarization isolator, the first fiber-based polarization controller, and the second fiber-based polarization controller by free space.

5. The mode-locked fiber laser of claim 2, wherein the polarization beam splitter is optically coupled, by optical fibers, with the polarization isolator and one of the first fiber-based polarization controller and the second fiber-based polarization controller.

6. The mode-locked fiber laser of claim 1, wherein the output coupler is positioned between the fiber-based gain medium and the first fiber-based polarization controller in the laser cavity.

7. The mode-locked fiber laser of claim 1, wherein the second fiber segment is configured to balance a self-phase modulation (SPM) in the laser cavity.

8. The mode-locked fiber laser of claim 1, wherein the second fiber segment is configured to compensate dispersion-induced pulse broadening or pulse compression in the fiber laser cavity.

9. The mode-locked fiber laser of claim 1, wherein the fiber-based gain medium comprises the first fiber segment.

10. The mode-locked fiber laser of claim 1, wherein the fiber-based gain medium is a double cladding fiber doped by Ytterbium or Erbium.

11. The mode-locked fiber laser of claim 1, wherein the input coupler, the fiber-based gain medium, the first fiber-based polarization controller, the polarization isolator, the second fiber-based polarization controller, and the output coupler in part form a ring-shaped laser cavity.

12. The mode-locked fiber laser of claim 1, wherein the second fiber segment comprises a single-mode fiber having an anomalous dispersion.

13. The mode-locked fiber laser of claim 1, wherein the length ratio of the second fiber segment to the first fiber segment is between about one and about three.

14. The mode-locked fiber laser of claim 1, wherein the ratio of the anomalous dispersion in the second fiber segment to the normal dispersion in the first fiber segment is between about two to five (2:5).

15. The mode-locked fiber laser of claim 1, wherein the first fiber segment and the second fiber segment produce a net anomalous dispersion for the laser cavity.

16. The mode-locked fiber laser of claim 1, wherein the polarization isolator is fabricated with a single-model optical fiber.

17. The mode-locked fiber laser of claim 1, wherein the fiber-based gain medium has a normal dispersion ranging from −30 ps/nm/km to −80 ps/nm/km.

18. The mode-locked fiber laser of claim 1, wherein the output laser pulses have pulse widths less than 200 femtosecond and an average power between 0.5 mW and 10 mW.

19. The mode-locked fiber laser of claim 1, wherein the output laser pulses have a Gaussian pulse shape, a soliton pulse shape, or a hyperbolic pulse shape.

20. The mode-locked fiber laser of claim 1, wherein the pump light has a different wavelength with the signal laser pulses.

21. A mode-locked fiber laser, comprising:
an input coupler configured to couple pump light into a laser cavity;
a fiber-based gain medium configured to amplify signal laser pulses in response to the pump light, wherein the signal laser pulses each has a peak portion having a peak polarization and a wing portion having a wing polarization different from the peak polarization;
a first fiber-based polarization controller configured to align the peak polarizations of the signal laser pulses along a first polarization direction;
a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;
a second fiber-based polarization controller configured to control the peak polarization of the peak portions of the signal laser pulses received from the polarization isolator, wherein the first fiber-based polarization controller, the polarization isolator, and the second fiber-based polarization controller are configured to produce mode locking in the signal laser pulses, wherein the polarization isolator is positioned between the first fiber-based polarization controller and the second fiber-based polarization controller, and wherein the input coupler, the fiber-based gain medium, the first fiber-based polarization controller, the polarization isolator, and the second fiber-based polarization controller in part define the laser cavity; and
a polarization beam splitter configured to direct a polarized portion of the signal laser pulses as output laser pulses out of the laser cavity, wherein the polarization beam splitter is positioned between the first fiber-based polarization controller and the second fiber-based polarization controller in the laser cavity.

22. The mode-locked fiber laser of claim 21, wherein the polarization beam splitter is separated from the polarization isolator, the first fiber-based polarization controller, and the second fiber-based polarization controller by free space.

23. The mode-locked fiber laser of claim 21, wherein the polarization beam splitter is optically coupled, by optical fibers, with the polarization isolator and one of the first fiber-based polarization controller and the second fiber-based polarization controller.

24. The mode-locked fiber laser of claim 21, wherein the polarization beam splitter is positioned between the fiber-based gain medium and the first fiber-based polarization controller in the laser cavity.

25. The mode-locked fiber laser of claim 21, wherein the fiber-based gain medium comprises a single-mode fiber having an anomalous dispersion.

26. The mode-locked fiber laser of claim 21, wherein the fiber-based gain medium has a normal (positive) dispersion, the mode-locked fiber laser further comprising a fiber segment having an anomalous (negative) dispersion to compensate the normal dispersion of the fiber-based gain medium.

27. The mode-locked fiber laser of claim 26, wherein the length ratio of the fiber-based gain medium to the fiber segment is between about one and about three.

28. The mode-locked fiber laser of claim 26, wherein the ratio of the anomalous dispersion in the fiber segment to the normal dispersion in the fiber-based gain medium is between about two to five (2:5).

29. The mode-locked fiber laser of claim 21, wherein the second fiber segment is configured to produce a net anomalous dispersion for the laser cavity.

30. The mode-locked fiber laser of claim 21, wherein the polarization isolator is fabricated with a single-model optical fiber.

31. A mode-locked fiber laser, comprising:
an input coupler configured to couple pump light into a laser cavity;
a fiber-based gain medium configured to amplify signal laser pulses in response to the pump light, wherein the signal laser pulses each has a peak portion having a peak polarization and a wing portion having a wing polarization different from the peak polarization, wherein the fiber-based gain medium has a normal (positive) dispersion;
a fiber segment having an anomalous (negative) dispersion to compensate the normal dispersion of the fiber-based gain medium, wherein the length ratio of the fiber-based gain medium to the fiber segment is between about one and about three, wherein the ratio of the anomalous dispersion in the fiber segment to the normal dispersion in the fiber-based gain medium is between about two to five (2:5);
a first fiber-based polarization controller configured to align the peak polarizations of the signal laser pulses along a first polarization direction;
a polarization isolator configured to receive the signal laser pulses from the first fiber-based polarization controller, and to uni-directionally pass the peak portions of the signal laser pulses having the peak polarizations aligned along the first polarization direction, wherein the polarization isolator is configured to block at least portions of the wing portions in the signal laser pulses;
a second fiber-based polarization controller configured to control the peak polarization of the peak portions of the signal laser pulses received from the polarization isolator, wherein the first fiber-based polarization controller, the polarization isolator, and the second fiber-based polarization controller are configured to produce mode locking in the signal laser pulses, wherein the polarization isolator is positioned between the first fiber-based polarization controller and the second fiber-based polarization controller, and wherein the input coupler, the fiber-based gain medium, the first fiber-based polarization controller, the polarization isolator, and the second fiber-based polarization controller in part define the laser cavity; and
an output coupler configured to direct portions of the signal laser pulses as output laser pulses out of the laser cavity.

* * * * *